(12) United States Patent
Hanayama

(10) Patent No.: US 9,594,424 B2
(45) Date of Patent: Mar. 14, 2017

(54) READING APPARATUS HAVING AN INTERFACE CONTROL DEVICE CONFIGURED TO BE SET INTO EITHER NORMAL STATE OR POWER SAVING STATE BASED WHETHER A DOCUMENT IS SUPPORTED OR NOT

(71) Applicant: Brother Kogyo Kabushiki Kaisha, Nagoya (JP)

(72) Inventor: Yukiyoshi Hanayama, Inazawa (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 14/808,130

(22) Filed: Jul. 24, 2015

(65) Prior Publication Data
US 2016/0034026 A1 Feb. 4, 2016

(30) Foreign Application Priority Data
Jul. 30, 2014 (JP) .................................. 2014-154517

(51) Int. Cl.
*G06F 1/00* (2006.01)
*G06F 1/32* (2006.01)
*G06F 13/40* (2006.01)

(52) U.S. Cl.
CPC ........ *G06F 1/3296* (2013.01); *G06F 13/4068* (2013.01); *Y02B 60/1228* (2013.01); *Y02B 60/1235* (2013.01)

(58) Field of Classification Search
CPC .................................................. G06F 1/3203
(Continued)

(56) References Cited

U.S. PATENT DOCUMENTS 8,832,484 B2 * 9/2014 Nishikawa ......... H04N 1/00896
713/300
8,964,203 B2 * 2/2015 Nishikawa ......... G06K 15/4055
358/1.14
(Continued)

FOREIGN PATENT DOCUMENTS

JP 2001-345980 A 12/2001
JP 2005-342954 A 12/2005
(Continued)

OTHER PUBLICATIONS

Yoshibumi, Compound Machine and Control Method of the same, Jun. 9, 2012, Canon Electronics, Inc., pp. 1-6, English translation of Japanese patent application No. JP 2011-030194 (Publication No. JP 2012-169934).*

*Primary Examiner* — Suresh Suryawanshi
(74) *Attorney, Agent, or Firm* — Burr & Brown, PLLC

(57) ABSTRACT

In a reading apparatus, a control device determines whether a predetermined state is detected based on a signal outputted from a sensor device. The control device sets a first-interface control device into a normal state when a transition condition is satisfied while the first-interface control device is being in a power saving state. The transition condition includes a condition that the predetermined state is detected. The control device maintains the first-interface control device in the power saving state when the transition condition is not satisfied while the first-interface control device is being in the power saving state, regardless of whether a receiving device receives first input.

15 Claims, 12 Drawing Sheets

(58) Field of Classification Search
USPC .......................................................... 713/323
See application file for complete search history.

(56) References Cited

U.S. PATENT DOCUMENTS

| | | | |
|---|---|---|---|
| 8,982,375 B2* | 3/2015 | Nishikawa | G06K 15/4055 358/1.14 |
| 2005/0190707 A1 | 9/2005 | Nishizawa et al. | |
| 2008/0201594 A1 | 8/2008 | Narushima | |
| 2012/0204046 A1 | 8/2012 | Baba et al. | |

FOREIGN PATENT DOCUMENTS

| | | |
|---|---|---|
| JP | 2008-204209 A | 9/2008 |
| JP | 2008-278107 A | 11/2008 |
| JP | 2009-048548 A | 3/2009 |
| JP | 2009-201134 A | 9/2009 |
| JP | 2011-087065 A | 4/2011 |
| JP | 2012-168211 A | 9/2012 |

* cited by examiner

READING APPARATUS HAVING AN INTERFACE CONTROL DEVICE CONFIGURED TO BE SET INTO EITHER NORMAL STATE OR POWER SAVING STATE BASED WHETHER A DOCUMENT IS SUPPORTED OR NOT

CROSS REFERENCE TO RELATED APPLICATION

This application claims priority from Japanese Patent Application No. 2014-154517 filed Jul. 30, 2014. The entire content of the priority application is incorporated herein by reference.

TECHNICAL FIELD

The present disclosure relates to a reading apparatus.

BACKGROUND

There is known a reading apparatus including: a USB (universal serial bus) host interface configured to be connected with a USB memory; and a USB host controller configured to control the USB host interface. The reading apparatus stores image data, which has been generated by reading a document, in a USB memory connected to the USB host interface.

In recent years, in order to meet the demands of power saving, apparatuses are generally brought into a power saving mode when an operation device, such as a button or a touch panel, has not been operated for a predetermined length of time. In the power saving mode, the amount of power supplied to components in the apparatus is reduced, in comparison with the normal mode.

There has been proposed a technology related to a reading apparatus provided with a USB host interface. According to this technology, when the reading apparatus is entered into the power saving mode, supply of power to the components, including a USB host controller, is stopped. Supply of power to the components is resumed when the reading apparatus is returned from the power saving mode to a normal mode.

SUMMARY

In a reading apparatus including a USB host interface, even when a process is executed in response to input on a receiving device, sometimes the USB host controller is not used in the process. For example, even when a process is executed in response to a user's operation on an operation device, sometimes the USB host controller is not used in the process. However, according to the technology described above, when a user's operation is performed on the operation device, the USB host controller is also supplied with power. Power is therefore unnecessarily consumed by the USB host controller.

This problem is not limited to a reading apparatus of a type that includes a USB host interface, but is common to various types of reading apparatuses that include an interface for being connected with an external device and the external device serves as a storage site for storing image data that the reading apparatus generates when reading a document.

It is therefore an object of the disclosure to solve at least part of the above-described problem and to provide an improved reading apparatus.

According to one aspect, a reading apparatus includes: a reading device; a support part; a sensor device; a receiving device; a first interface; a first-interface control device; and a control device. The reading device is configured to read a document and generate image data. The support part is configured to support the document to be read by the reading device. The sensor device is configured to output a signal corresponding to a predetermined state, the predetermined state occurring when a document is supported by the support part. The receiving device is configured to receive input. The first interface is configured to be connected with a first external device, the first external device being configured to store the image data generated by the reading device. The first-interface control device is configured to control the first interface. The first-interface control device is configured to be set into either one of a plurality of different states. The plurality of states includes a normal state and a power saving state. The first-interface control device in the normal state is capable of detecting whether the first external device is connected with the first interface. The first-interface control device in the power saving state is incapable of detecting whether the first external device is connected with the first interface. An amount of power consumed by the first-interface control device in the power saving state is smaller than that consumed by the first-interface control device in the normal state. The control device is configured to: determine whether the predetermined state is detected based on the signal outputted from the sensor device; set the first-interface control device into the normal state when a transition condition is satisfied while the first-interface control device is being in the power saving state, the transition condition including a condition that the predetermined state is detected; and maintain the first-interface control device in the power saving state when the transition condition is not satisfied while the first-interface control device is being in the power saving state, regardless of whether the receiving device receives first input.

According to another aspect, a method for controlling a reading apparatus is provided. The reading apparatus includes: a reading device configured to read a document and generate image data; a support part configured to support the document to be read by the reading device; a sensor device configured to output a signal corresponding to a predetermined state, the predetermined state occurring when a document is supported by the support part; a receiving device configured to receive input; a first interface configured to be connected with a first external device, the first external device being configured to store the image data generated by the reading device; a first-interface control device configured to control the first interface, the first-interface control device being configured to be set into either one of a plurality of different states, the plurality of states including a normal state and a power saving state, the first-interface control device in the normal state being capable of detecting whether the first external device is connected with the first interface, the first-interface control device in the power saving state being incapable of detecting whether the first external device is connected with the first interface, an amount of power consumed by the first-interface control device in the power saving state being smaller than that consumed by the first-interface control device in the normal state. The method includes: determining whether the predetermined state is detected based on the signal outputted from the sensor device; setting the first-interface control device into the normal state when a transition condition is satisfied while the first-interface control device is being in the power saving state, the transition condition including a condition that the predetermined state is detected; and maintaining the first-interface control device in the power saving state when the transition condition is not satisfied while the first-interface control device is being in the power saving state, regardless of whether the receiving device receives first input.

According to still another aspect, a non-transitory computer readable storage medium storing a set of program instructions installed on and executed by a computer for controlling a reading apparatus is provided. The reading apparatus includes: a reading device configured to read a document and generate image data; a support part configured to support the document to be read by the reading device; a sensor device configured to output a signal corresponding to a predetermined state, the predetermined state occurring when a document is supported by the support part; a receiving device configured to receive input; a first interface configured to be connected with a first external device, the first external device being configured to store the image data generated by the reading device; a first-interface control device configured to control the first interface, the first-interface control device being configured to be set into either one of a plurality of different states, the plurality of states including a normal state and a power saving state, the first-interface control device in the normal state being capable of detecting whether the first external device is connected with the first interface, the first-interface control device in the power saving state being incapable of detecting whether the first external device is connected with the first interface, an amount of power consumed by the first-interface control device in the power saving state being smaller than that consumed by the first-interface control device in the normal state. The program instructions includes: determining whether the predetermined state is detected based on the signal outputted from the sensor device; setting the first-interface control device into the normal state when a transition condition is satisfied while the first-interface control device is being in the power saving state, the transition condition including a condition that the predetermined state is detected; and maintaining the first-interface control device in the power saving state when the transition condition is not satisfied while the first-interface control device is being in the power saving state, regardless of whether the receiving device receives first input.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
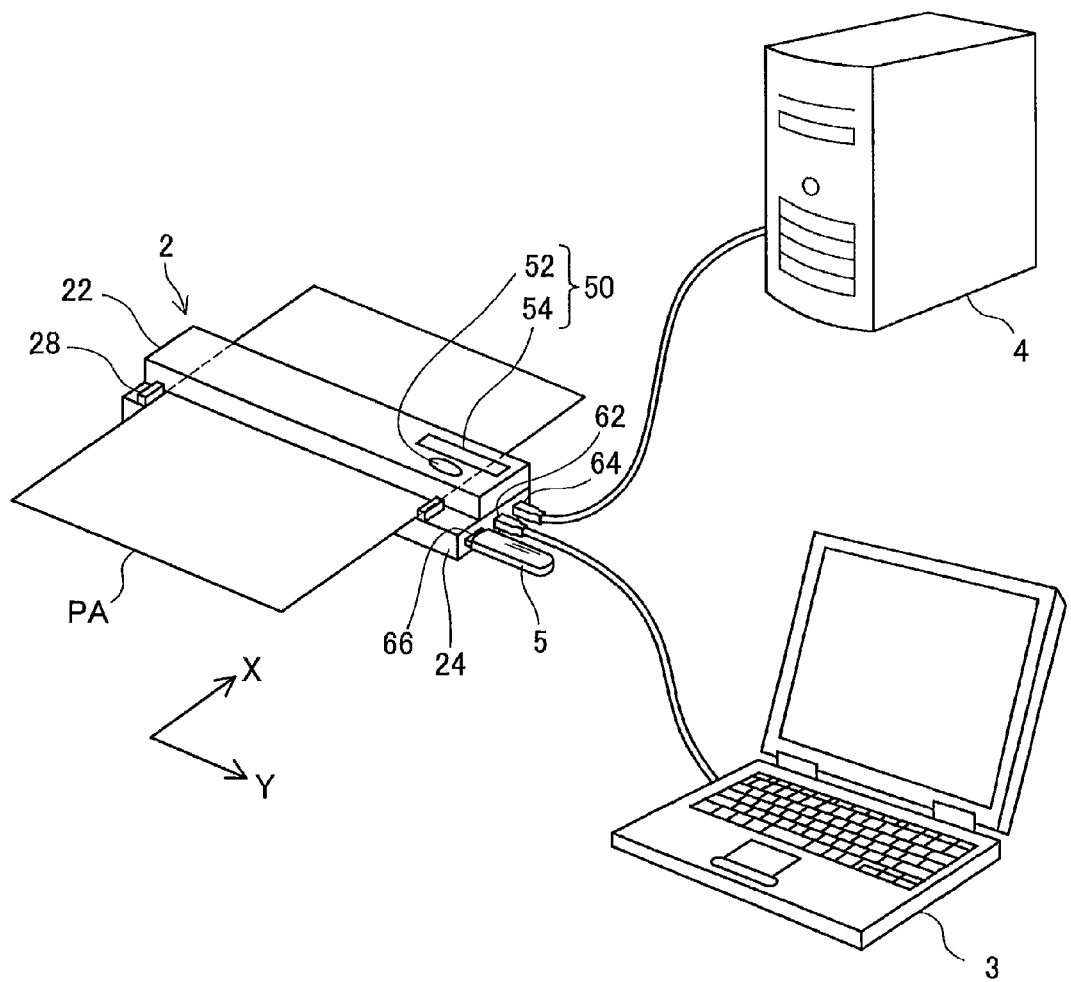
FIG. 1 is a perspective view of a system including a scanner according to an embodiment, and illustrates configurations of the scanner and system, wherein the scanner is in the closed state.

A reading apparatus according to an embodiment will be described while referring to the accompanying drawings wherein like parts and components are designated by the same reference numerals to avoid duplicating description.

A configuration of a scanner 2 according to an embodiment will be described with reference to FIGS. 1 to 3. The scanner 2 has an automatic document feeding function to generate image data by reading a document PA while conveying the document PA in a conveying direction X.

Figure 2:
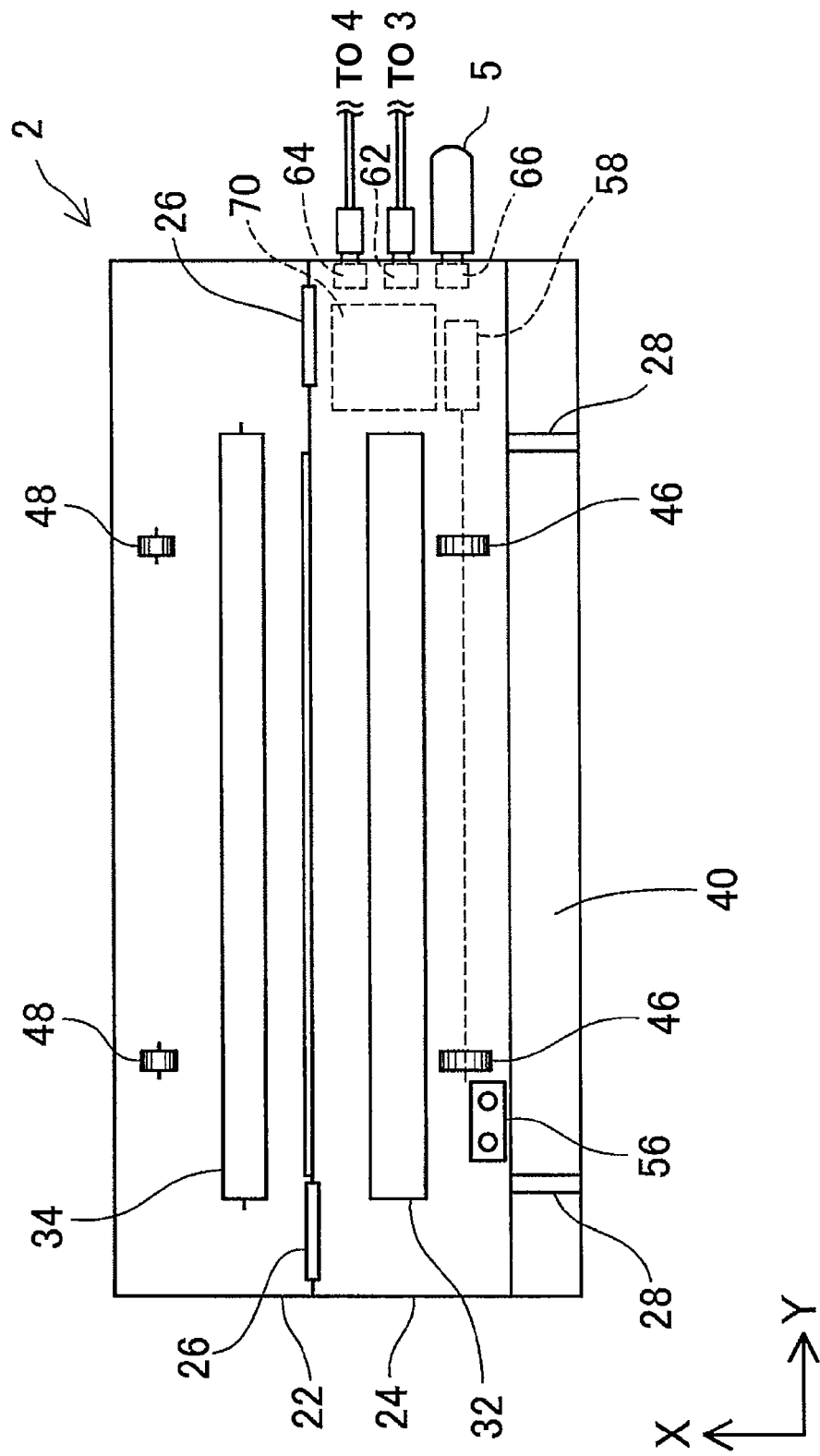
FIG. 2 is a plan view illustrating a configuration of the scanner, wherein the scanner is in the opened state.

As illustrated in FIGS. 1 and 2, the scanner 2 includes an upper housing 22 and a lower housing 24. The upper housing 22 is connected to the lower housing 24 so as to be pivotally movable relative to the lower housing 24 about hinges 26. By pivotally moving the upper housing 22 relative to the lower housing 24, the state of the scanner 2 can be brought into: a closed state illustrated in FIG. 1, in which part of an upper surface of the lower housing 24 is covered with the upper housing 22; and an opened state illustrated in FIG. 2, in which the upper surface of the lower housing 24 is not covered with the upper housing 22 and is exposed. The scanner 2 performs reading of the document PA when the scanner 2 is in the closed state.

The upper housing 22 is provided with an operation device 50. The operation device 50 is configured to be operated or manipulated by a user. In other words, the operation device 50 is configured to receive a user's operation or manipulation. The operation device 50 includes a button 52 and a touch panel 54. The touch panel 54 is configured of a liquid crystal display, for example. The touch panel 54 also functions as a display unit for displaying various types of information. The operation device 50 is an example of a receiving device.

In the lower housing 24, there are provided conveying rollers 46 and a conveying motor 58. The conveying motor 58 is configured to drive the conveying rollers 46 to rotate. In the upper housing 22, there are provided pinch rollers 48 at such positions that the pinch rollers 48 confront the conveying rollers 46 when the scanner 2 is in the closed state. In the lower housing 24, there is provided a pair of guides 28 at an upstream side in the conveying direction X from the conveying rollers 46. The pair of guides 28 is apart from each other in a width direction Y that is substantially perpendicular to the conveying direction X. A portion of the upper surface of the lower housing 24 at an upstream side in the conveying direction X from the conveying rollers 46 is defined as a support part 40 supporting a document PA thereon. With the above-described configuration, when the conveying rollers 46 are driven to rotate by the conveying motor 58 while the scanner 2 is in the closed state, a document PA supported on the support part 40 is conveyed between the upper housing 22 and the lower housing 24 in the conveying direction X while being pinched by the conveying rollers 46 and the pinch rollers 48.

In the lower housing 24, there is provided an image sensor 32. The image sensor 32 is of a contact type. The image sensor 32 includes: a light source (not shown); a rod lens array (not shown); and a light-receiving element array (not shown). The image sensor 32 is configured to read the conveyed document PA and generate image data. There is provided a document platen 34 on the lower surface of the upper housing 22 (surface facing the lower housing 24 in the closed state) at such a position that the document platen 34 faces the image sensor 32.

In the lower housing 24, there is provided a document sensor 56 at an upstream side in the conveying direction X from the image sensor 32. The document sensor 56 includes a light-emitting element and a light-receiving element. When no document PA is supported on the support part 40, light irradiated from the light-emitting element of the document sensor 56 is not received by the light-receiving element. On the other hand, when a document PA is supported on the support part 40, light irradiated from the light-emitting element of the document sensor 56 is reflected by the document PA and is received by the light-receiving element. For this reason, the document sensor 56 outputs signals that are different between when no document PA is supported on the support part 40 and when a document PA is supported on the support part 40. The state where a document PA is supported on the support part 40 is an example of a predetermined state that occurs when a document PA is supported by the support part 40, and the document sensor 56 is an example of a sensor device.

As illustrated in FIGS. 1 and 2, the scanner 2 is provided with interfaces of various types which are configured to be connected with external devices of various types. More specifically, the scanner 2 is provided with interfaces of three types, that is, a USB device interface 62, a network interface 64, and a USB host interface 66. The USB device interface 62 is also called "USB function interface" or "USB peripheral interface".

In the scanner 2, image data which has been generated by reading a document PA can be stored in external devices connected to the interfaces. For example, the scanner 2 can store image data into: a personal computer (PC) 3 that is connected through the USB device interface 62; a server 4 located on a network such as a LAN that is connected through the network interface 64; or a USB memory 5 that is connected through the USB host interface 66. Hereinafter, the process of reading a document PA, generating image data, and storing the generated image data in the USB memory 5 is referred to as a "scan-to-USB memory process". The USB memory 5 is an example of a first external device, and the USB host interface 66 is an example of a first interface. The PC 3 is an example of a second external device and an example of another external device, and the USB device interface 62 is an example of a second interface and an example of another interface. The server 4 is an example of the second external device, and the network interface 64 is an example of the second interface.

Examples of a state that an external device is connected to an interface are not limited to a case where an external device is connected directly to an interface, but also include a case where an external device is connected to an interface indirectly, that is, via a communication medium such as a communication cable or wireless communication. Examples of a state that an external device is connected to an interface via wireless communication include a state that a wireless communication session is being established.

Examples of a state that an external device is capable of communicating with the scanner 2 via an interface are not limited to a case where an external device is capable of communicating with the scanner 2 directly, but also include a case where an external device is capable of communicating with the scanner 2 indirectly, that is, via a communication medium, such as a communication cable or wireless communication. Examples of a state that an external device is capable of communicating with the scanner 2 via wireless communication include a state that a wireless communication session is being established.

Figure 3:
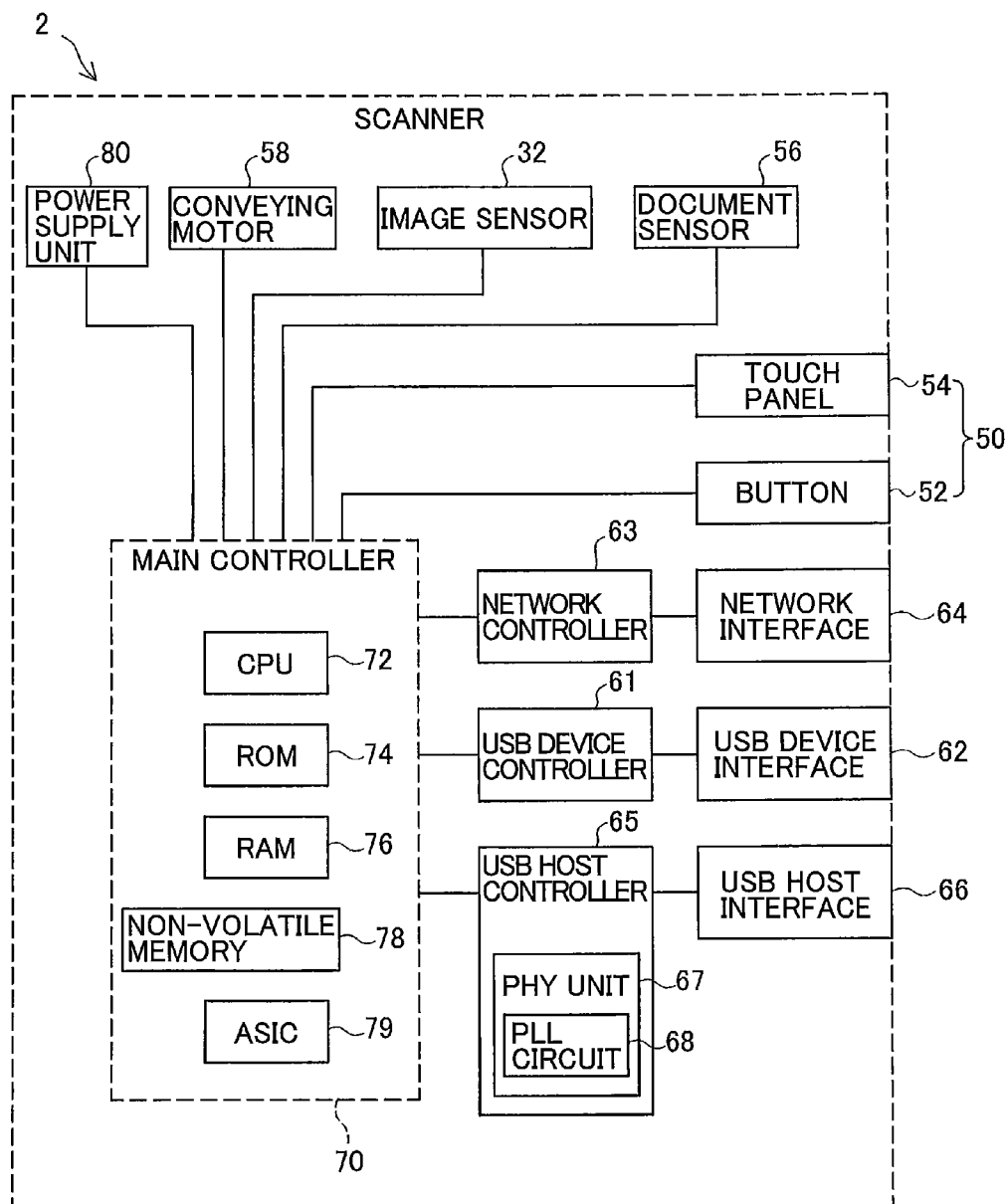
FIG. 3 is a block diagram illustrating an electrical configuration of the scanner.

As illustrated in FIG. 3, besides the above-described components, the scanner 2 includes: a USB device controller 61; a network controller 63; a USB host controller 65; a power supply unit 80; and a main controller 70. The USB device controller 61 is configured to control the USB device interface 62. The network controller 63 is configured to control the network interface 64. The USB host controller 65 is configured to control the USB host interface 66. The power supply unit 80 is configured to supply power to the components in the scanner 2. The main controller 70 is configured to control operations of the components in the scanner 2. The USB host controller 65 is an example of a first-interface control device, and the USB device controller 61 and the network controller 63 are examples of a second-interface control device.

The main controller 70 includes a CPU 72, a ROM 74, a RAM 76, a non-volatile memory 78, and an ASIC (application specific integrated circuit) 79.

The ROM 74 stores programs for controlling the operations of the components in the scanner 2. These programs are read from various types of storage media, such as a flexible disk, a CD-ROM, and a memory card, and then are stored in the ROM 74. The RAM 76 is used as a work area and a temporary data storage area when the CPU 72 executes various programs. The non-volatile memory 78 is a rewritable memory such as an NVRAM, a flash memory, an HDD, or an EEPROM.

The CPU 72 is an example of a control device, and controls operations of the components in the scanner 2 by executing the programs read from the ROM 74. For example, the CPU 72 detects that a document PA is supported on the support part 40, on the basis of a signal outputted from the document sensor 56. When a user's operation is received by the operation device 50, the CPU 72 executes a process corresponding to the contents of the operation. When a command is inputted from the PC 3 through the USB device interface 62, the CPU 72 executes a process corresponding to the contents of the command. For example, the CPU 72 sets, as a storage site for storing image data generated by reading a document PA, one of the external devices that are connected through the interfaces (for example, one of the PC 3, the server 4, and the USB memory 5). The CPU 72 then stores information on the thus set storage site in the RAM 76 or the non-volatile memory 78. The CPU 72 controls the conveying motor 58 and the image sensor 32 to read a document PA and stores the generated image data in the set storage site. The CPU 72 can communicate with the external devices (PC 3, server 4, and USB memory 5) when the external devices are connected to the corresponding interfaces (USB device interface 62, network interface 64, and USB host interface 66).

The CPU 72 can set the state of each component in the scanner 2 to one of a normal state and a power saving state so that the amount of power consumed by the each component is smaller in the power saving state than in the normal state.

For example, the CPU 72 can set a state of the touch panel 54 to one of: a normal state (operation-device normal state); and a power saving state (operation-device power saving state). The operation-device normal state is an example of a receiving-device normal state, and the operation-device power saving state is an example of a receiving-device power saving state. While the touch panel 54 is being in the operation-device normal state, a light source provided in the touch panel 54 is being on and the touch panel 54 is able to display various types of information. On the other hand, while the touch panel 54 is being in the operation-device power saving state, the light source in the touch panel 54 is being off and the touch panel 54 is unable to display the various types of information. The CPU 72 can switch the touch panel 54 to the power saving state when the operation device 50 has not been operated by a user for a predetermined length of time while the touch panel 54 is being in the normal state. The CPU 72 can return the touch panel 54 to the normal state when the operation device 50 is operated by a user while the touch panel 54 is being in the power saving state.

The CPU 72 can set a state of the USB host controller 65 to one of: a normal state where the USB host controller 65 is supplied with power from the power supply unit 80 and is able to detect whether the USB host interface 66 is connected with an external device such as a USB memory 5; and a power saving state where the USB host controller 65 is not supplied with power from the power supply unit 80 and is unable to detect whether the USB host interface 66 is connected with an external device such as a USB memory 5. Timings when the USB host controller 65 is switched between the normal state and the power saving state will be described later in detail.

The USB host controller 65 will be described below in greater detail. The USB host controller 65 includes a PHY (physical layer) unit 67. The PHY unit 67 is provided with a PLL (phase locked loop) circuit 68, in order to cope with multiple communication rates regulated in the USB 2.0 standard. A predetermined amount of power needs to be supplied to the PHY unit 67, in order that the USB host controller 65 can detect whether an external device such as a USB memory 5 is connected to the USB host interface 66. The predetermined amount of power that needs to be supplied to the PHY unit 67 is relatively high because the PLL circuit 68 consumes a relatively high amount of power.

While the main power supply of the scanner 2 is being in the ON state, even though the operation device 50 has not been operated by a user for the predetermined length of time, supply of power to the document sensor 56 is not stopped and the document sensor 56 continues being capable of detecting whether a document PA is supported on the support part 40. Supply of power to the conveying motor 58 and the image sensor 32 is started when reading of a document PA is started.

Next will be described, with reference to FIG. 4, a process of switching the state of the USB host controller 65 between the normal state and the power saving state according to a first example. The process is started when the main power supply of the scanner 2 is turned ON. It is noted that the USB host controller 65 has been set to the power saving state when the process is started. The process of switching the state of the USB host controller 65 is ended when the main power supply of the scanner 2 is turned OFF by a user.

When the process is started, the CPU 72 determines in S110 whether or not a document PA is supported on the support part 40, on the basis of a signal outputted from the document sensor 56. When the CPU 72 determines that no document PA is supported on the support part 40 (No in S110), the CPU 72 sets in S120 the USB host controller 65 to the power saving state. It is noted that "setting the USB host controller 65 to the power saving state" denotes maintaining the power saving state when the USB host controller 65 has already been in the power saving state, and denotes switching the state of the USB host controller 65 from the normal state to the power saving state when the USB host controller 65 has been in the normal state.

As described above, when the USB host controller 65 is in the power saving state, the USB host controller 65 is unable to detect whether the USB host interface 66 is connected with a USB memory 5. However, when no document PA is supported on the support part 40, the possibility that the scan-to-USB memory process will be executed is relatively low. So, setting the USB host controller 65 to the power saving state does not impair the convenience of the user. The procedure then returns from S120 back to S110, and the CPU 72 repeats the above-described processes from S110.

On the other hand, when the CPU 72 determines that a document PA is supported on the support part 40 (Yes in S110), the CPU 72 sets in S130 the USB host controller 65 to the normal state. It is noted that "setting the USB host controller 65 to the normal state" denotes maintaining the normal state when the USB host controller 65 has been in the normal state, and denotes switching the state of the USB host controller 65 from the power saving state to the normal state when the USB host controller 65 has been in the power saving state.

As described above, when the USB host controller 65 is in the normal state, the USB host controller 65 is able to detect whether a USB memory 5 is connected to the USB host interface 66, and therefore is able to write data in the USB memory 5. When a document PA is supported on the support part 40, it can be said that the possibility that the scan-to-USB memory process will be executed is relatively high. So, the CPU 72 sets the USB host controller 65 to the normal state, in preparation for execution of the scan-to-USB memory process.

After the CPU 72 sets the USB host controller 65 to the normal state in S130, the CPU 72 determines in S140 whether or not a command to execute the scan-to-USB memory process is received from the operation device 50 or through the USB device interface 62 from the PC 3. When a command to execute the scan-to-USB memory process has not been received (No in S140), the procedure returns to S110. For example, now assume such a case that the CPU 72 determines that a document PA is still supported on the support part 40 when the process of S110 is executed after the process of S140 is executed. In such a case, the CPU 72 maintains the USB host controller 65 in the normal state in S130. On the other hand, now also assume another case that the CPU 72 determines that the document PA is no longer supported on the support part 40 when the process of S110 is executed after the process of S140 is executed. In such a case, the CPU 72 switches the USB host controller 65 from the normal state to the power saving state in S120.

On the other hand, when a command to execute the scan-to-USB memory process is received (Yes in S140), the CPU 72 controls the conveying motor 58, image sensor 32, and USB host controller 65 to execute the scan-to-USB memory process in S150. The procedure then returns to S110.

As described above, in the process of switching the state of the USB host controller 65 according to the first example, the CPU 72 sets the USB host controller 65 to the normal state when it is detected that a document PA is supported on the support part 40. This ensures that when the document PA is read thereafter, generated image data can be stored in a USB memory 5 connected to the USB host interface 66. Accordingly, deterioration in the convenience of the user can be suppressed.

On the other hand, while it is not being detected that a document PA is supported on the support part 40 (No in S110), the USB host controller 65 is maintained in the power saving state even when the operation device 50 is operated or manipulated by a user. It is noted that while no document PA is being supported on the support part 40, it can be said that the possibility that the scan-to-USB memory process will be executed is relatively low. So, the convenience of the user is not impaired, even though the USB host controller 65 is set to the power saving state.

According to the present example, while the possibility that the scan-to-USB memory process will be executed is being relatively low, the USB host controller 65 is maintained in the power saving state. Unnecessary power consumption by the USB host controller 65 can therefore be suppressed. Power consumption by the scanner 2 can be suppressed.

The amount of power consumed by the USB host controller 65 is relatively high among the components constituting the scanner 2. A difference in the amounts of power consumption between the time when the USB host controller 65 is in the normal state and the time when the USB host controller 65 is in the power saving state, is generally larger than the amount of power consumption by the document sensor 56. Therefore, by switching the USB host controller 65 to the power saving state at the above-described timings while maintaining the document sensor 56 as being capable of detecting a document PA, it is possible to effectively suppress the amount of power consumed by the scanner 2 without impairment of the convenience of the user.

According to the present example, a transition condition for setting the USB host controller 65 to the normal state is that a document PA is supported on the support part 40.

Next will be described, with reference to FIG. 5, the process of switching the state of the USB host controller 65 according to another example (second example). Among the steps in a flowchart illustrated in FIG. 5, the same steps as those in the flowchart illustrated in FIG. 4 are denoted by the same reference numerals, and description thereof is omitted. The same is also applied to flowcharts illustrated in FIGS. 6-12.

Figure 4:
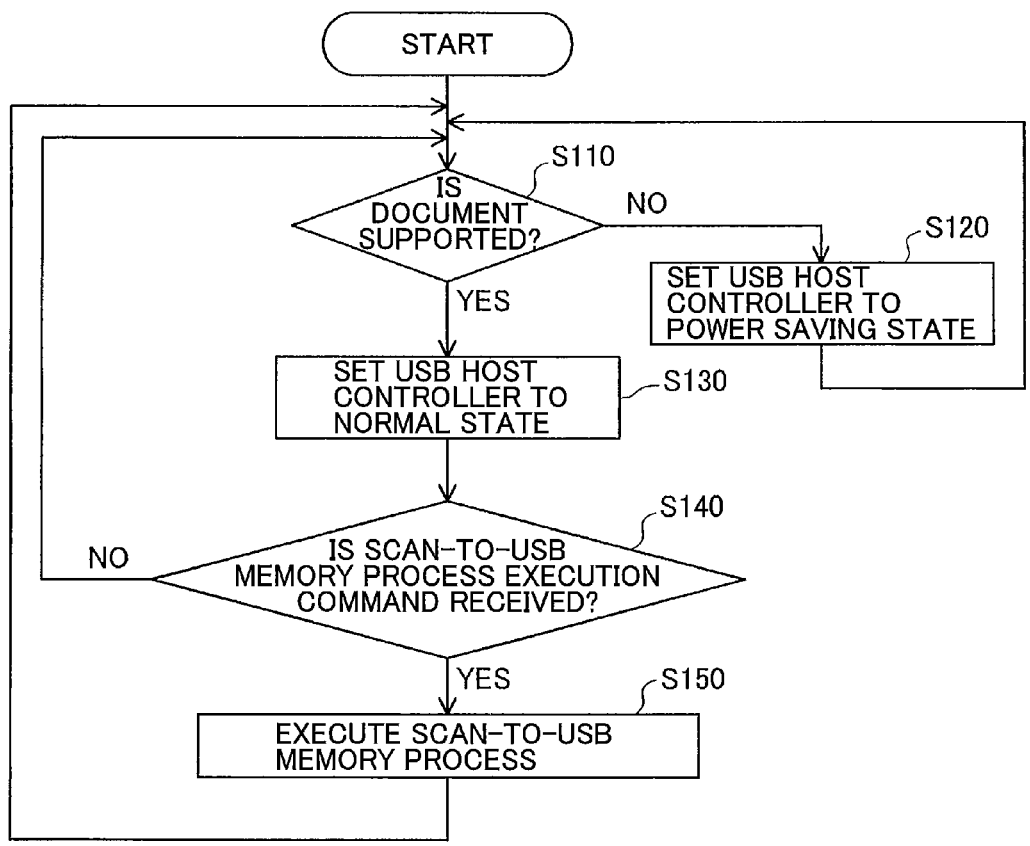
FIG. 4 is a flowchart illustrating a process of switching the state of a USB host controller according to an example (first example)
Figure 5:
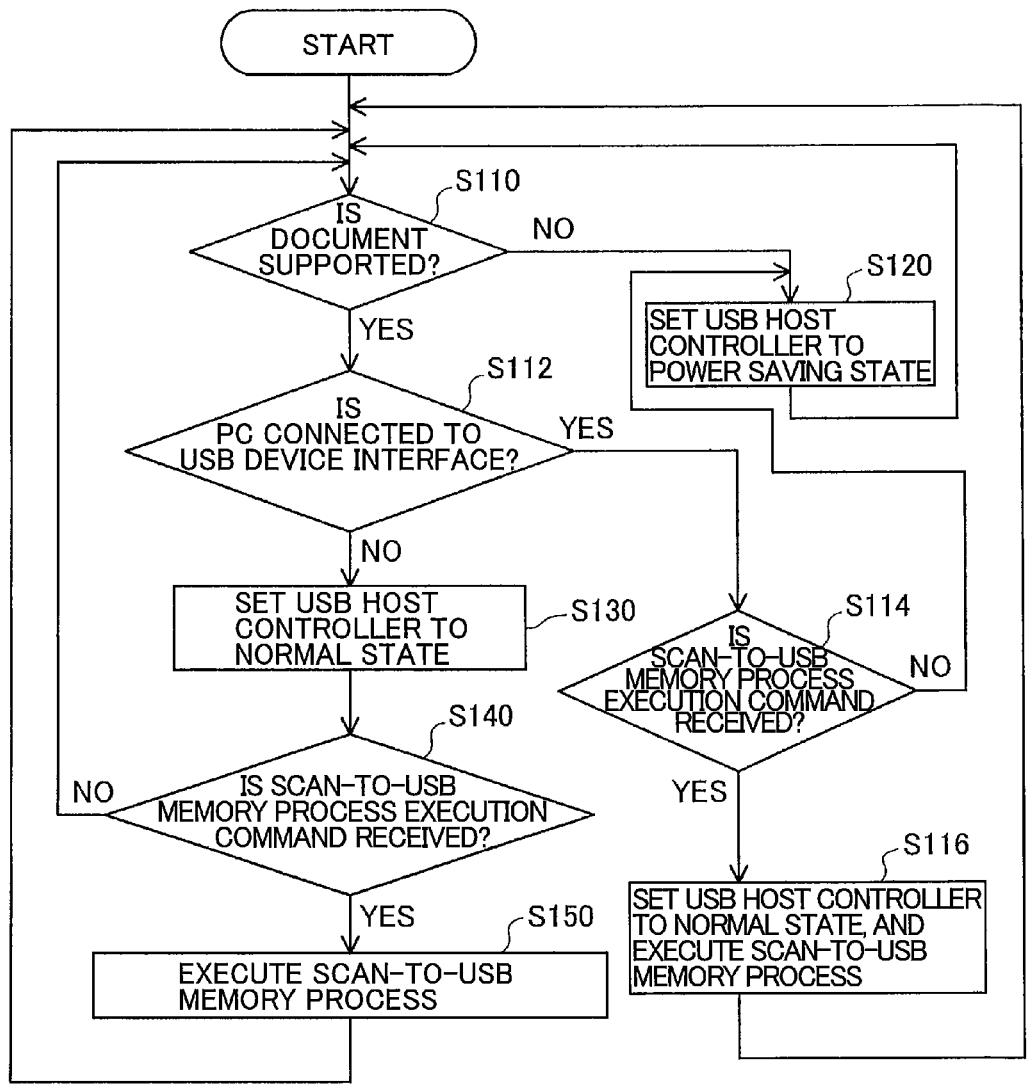
FIG. 5 is a flowchart illustrating the process of switching the state of the USB host controller according to another example (second example)

The process in the second example illustrated in FIG. 5 is different from that in the first example illustrated in FIG. 4 in that processes of S112, S114, and S116 are executed. More specifically, in the process of the second example illustrated in FIG. 5, when the CPU 72 determines that a document PA is supported on the support part 40 (Yes in S110), the CPU 72 determines in S112 whether or not the USB device interface 62 is connected with an external device such as the PC 3. When the CPU 72 determines that the USB device interface 62 is not connected with the PC 3 (No in S112), the CPU 72 sets in S130 the USB host controller 65 to the normal state. When a document PA is supported on the support part 40 and the USB device interface 62 is not connected with the PC 3, it can be said that the possibility that the scan-to-USB memory process will be executed is relatively high. Therefore, the CPU 72 sets the USB host controller 65 to the normal state, in preparation for execution of the scan-to-USB memory process. The procedure then proceeds from S130 to S140.

On the other hand, when the CPU 72 determines that the USB device interface 62 is connected with a PC 3 (Yes in S112), the CPU 72 determines in S114 whether or not a command to execute the scan-to-USB memory process has been received. When the command to execute the scan-to-USB memory process has not been received (No in S114), the CPU 72 sets in S120 the USB host controller 65 to the power saving state. The procedure then returns to S110.

On the other hand, when a command to execute the scan-to-USB memory process has been received (Yes in S114), the CPU 72 sets the USB host controller 65 to the normal state and executes the scan-to-USB memory process in S116. The procedure then returns to S110.

When a document PA is supported on the support part 40 (yes in S110) and the PC 3 is connected to the USB device interface 62 (yes in S112), it can be said that the possibility that the scan-to-USB memory process will be executed is relatively low, but the possibility that a scan-to-PC process will be executed is relatively high, wherein the scan-to-PC process is defined as a process to read a document PA, generate image data, and store the image data in the PC 3. When the possibility that the scan-to-USB memory process will be executed is relatively low, the USB host controller 65 is set to the power saving state. Unnecessary power consumption by the USB host controller 65 can therefore be suppressed.

In addition, in the second example illustrated in FIG. 5, even though the PC 3 is connected to the USB device interface 62 (yes in S112), when a command to execute the scan-to-USB memory process is issued (yes in S114), the procedure proceeds to S116 in which the USB host controller 65 is set to the normal state and the scan-to-USB memory process is executed. Accordingly, deterioration in the convenience of the user can be suppressed.

In the second example, the transition condition for setting the USB host controller 65 to the normal state is that a document PA is supported on the support part 40 and the USB device interface 62 is not connected with a PC 3.

Figure 6:
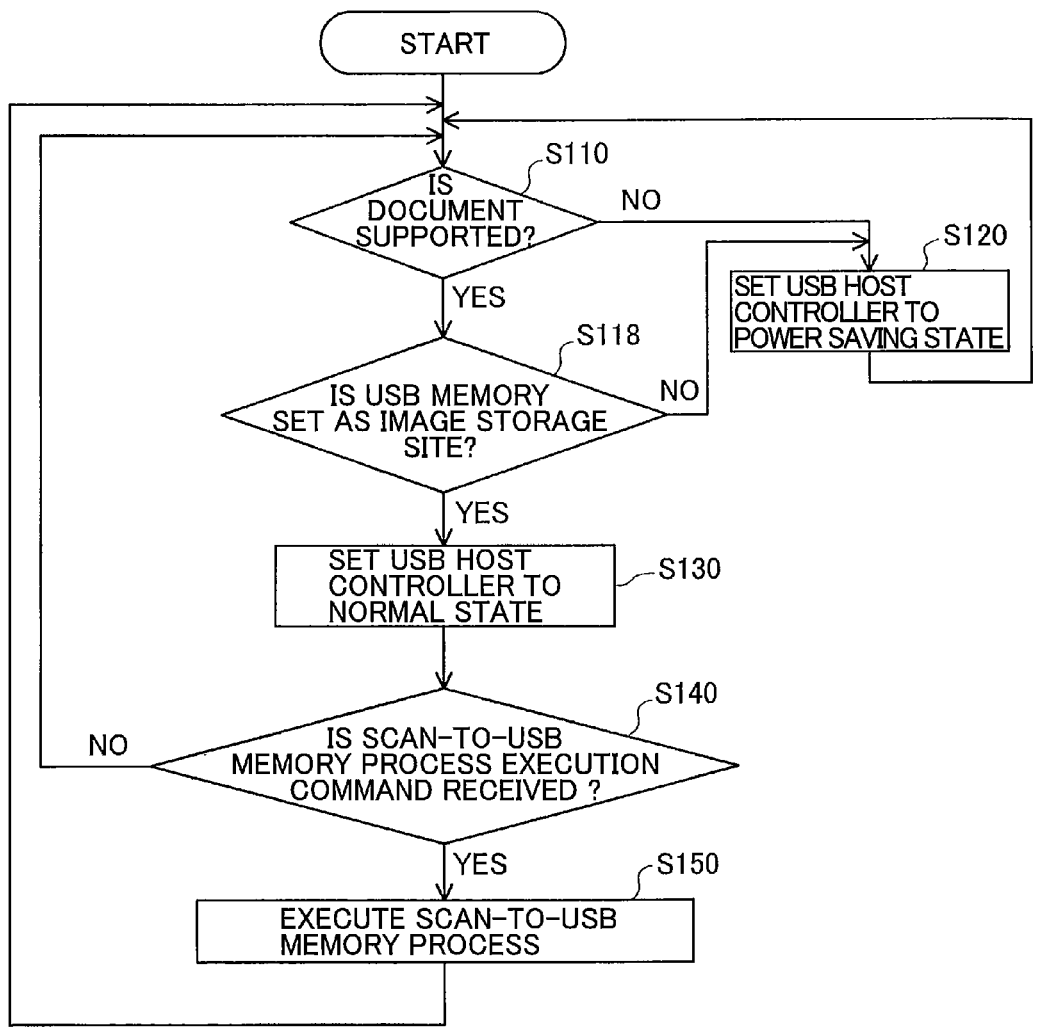
FIG. 6 is a flowchart illustrating the process of switching the state of the USB host controller according to still another example (third example)

Next will be described, with reference to FIG. 6, the process of switching the state of the USB host controller 65 according to still another example (third example). The process in the third example illustrated in FIG. 6 is different from the process in the first example illustrated in FIG. 4 in that a process of S118 is executed. More specifically, in the process illustrated in FIG. 6, when the CPU 72 determines that a document PA is supported on the support part 40 (Yes in S110), the CPU 72 determines in S118 whether or not a USB memory 5 is set as a storage site for image data generated by reading a document PA. As described above, information on the storage site for the generated image data is stored in the RAM 76 or the non-volatile memory 78. When the CPU 72 determines that a USB memory 5 is set as a storage site for the image data (Yes in S118), the CPU 72 sets the USB host controller 65 to the normal state in S130. When a document PA is supported on the support part 40 and a USB memory 5 is set as a storage site for image data, it can be said that the possibility that the scan-to-USB memory process will be executed is relatively high. So, the CPU 72 sets the USB host controller 65 to the normal state, in preparation for execution of the scan-to-USB memory process. The process then proceeds to S140.

On the other hand, when the CPU 72 determines that a USB memory 5 is not set as a storage site for image data (No in S118), the CPU 72 sets the USB host controller 65 to the power saving state (S120). The process then returns to S110.

Although a document PA is supported on the support part 40, when a USB memory 5 is not set as a storage site for image data, it can be said that the possibility that the scan-to-USB memory process will be executed is relatively low. When the possibility that the scan-to-USB memory process will be executed is thus relatively low, the USB host controller 65 is set to the power saving state. Unnecessary power consumption by the USB host controller 65 can therefore be suppressed.

In the third example, the transition condition for setting the USB host controller 65 to the normal state is that a document PA is supported on the support part 40 and USB memory 5 is set as a storage site for image data.

Figure 7:
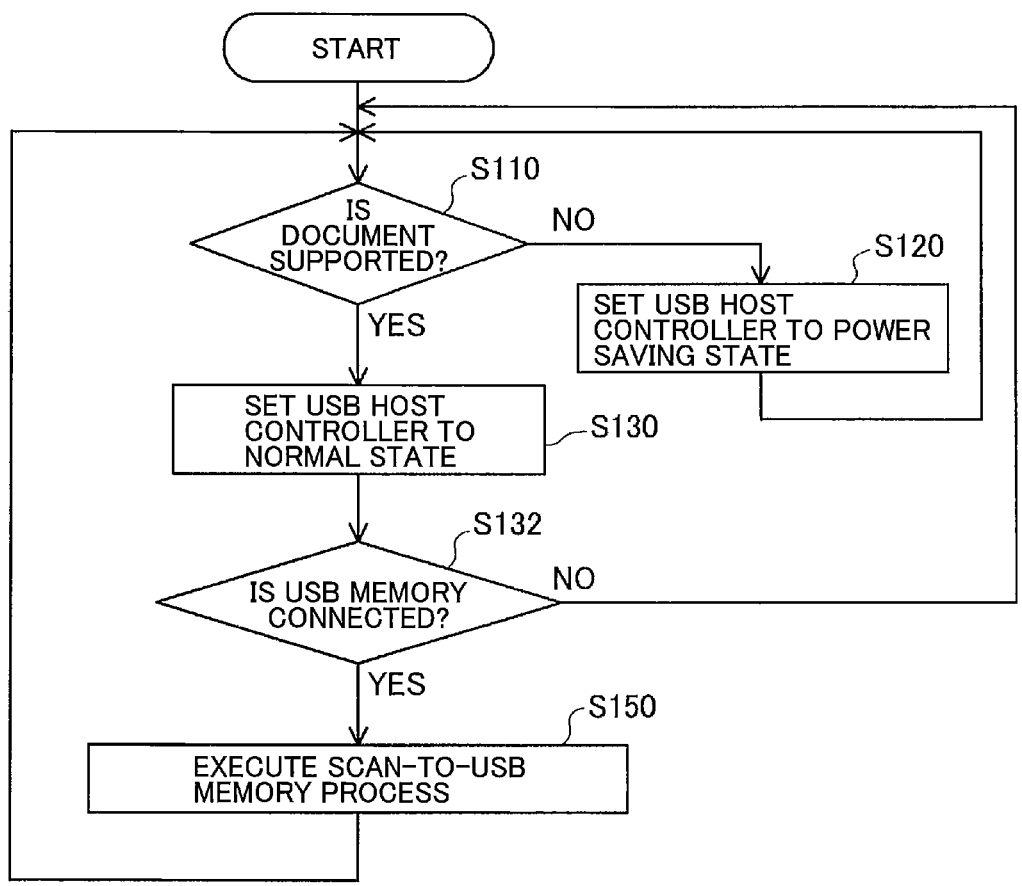
FIG. 7 is a flowchart illustrating the process of switching the state of the USB host controller according to another example (fourth example)

Next will be described, with reference to FIG. 7, the process of switching the state of the USB host controller 65 according to still another example (fourth example). The process in the fourth example illustrated in FIG. 7 is different from that of the first example illustrated in FIG. 4 in that the process of S140 is not executed but a process of S132 is executed instead. More specifically, in the process illustrated in FIG. 7, after the CPU 72 determines that a document PA is supported on the support part 40 (Yes in S110), the USB host controller 65 is set to the normal state in S130, and the CPU 72 determines in S132 whether or not the USB host interface 66 is connected with a USB memory 5. When the CPU 72 determines that the USB host interface 66 is connected with a USB memory 5 (Yes in S132), the CPU 72 automatically executes the scan-to-USB memory process in S150, even though the CPU 72 has received no command to execute the scan-to-USB memory process.

On the other hand, when the CPU 72 determines that the USB host interface 66 is not connected with a USB memory 5 (No in S132), the procedure returns to S110.

In this manner, in the process illustrated in FIG. 7, when it is determined that a document PA is supported on the support part 40, the USB host controller 65 is set to the normal state. Then, when connection with a USB memory 5 is detected, the CPU 72 automatically executes the scan-to-USB memory process, without receiving a command to execute the scan-to-USB memory process. Accordingly, in the process illustrated in FIG. 7, the scanner 2 can suppress power consumption, while improving the convenience of the user.

Figure 8:
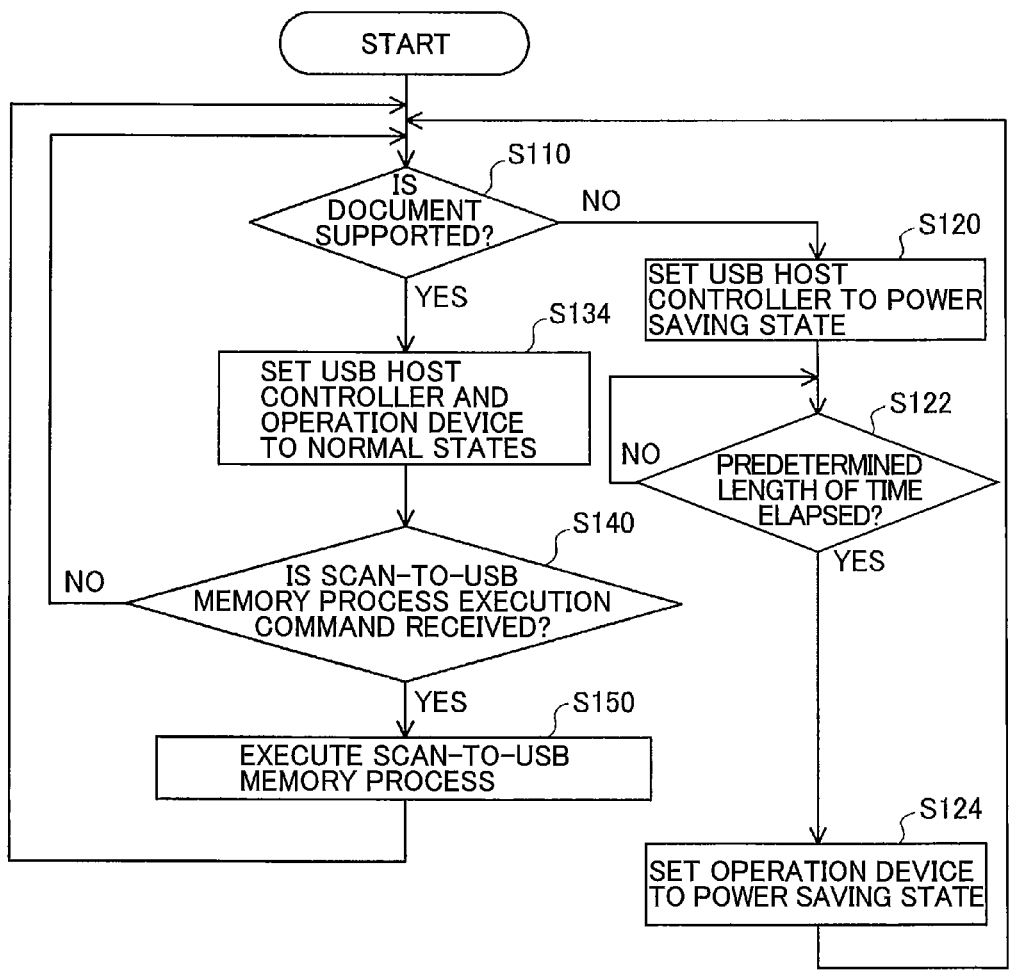
FIG. 8 is a flowchart illustrating the process of switching the state of the USB host controller according to still another example (fifth example)

Next will be described, with reference to FIG. 8, the process of switching the state of the USB host controller 65 according to still another example (fifth example). The process of the fifth example illustrated in FIG. 8 is different from that of the first example illustrated in FIG. 4 in that processes of S122, S124, and S134 are executed. More specifically, in the process illustrated in FIG. 8, when the CPU 72 determines that a document PA is supported on the support part 40 (Yes in S110), the procedure proceeds to S134, in which the CPU 72 sets the USB host controller 65 to the normal state, and sets the operation device 50 to the normal state (operation-device normal state). The procedure then proceeds to S140. It is noted that both of the USB host controller 65 and the operation device 50 have been set to their power saving states when the process illustrated in FIG. 8 is started.

After the scan-to-USB memory process is executed in S150, when the CPU 72 determines in S110 that a document PA is no longer supported on the support part 40 (No in S110), the CPU 72 sets the USB host controller 65 to the power saving state in S120. Next, the CPU 72 monitors in S122 whether a predetermined length of time has elapsed. When the predetermined length of time has elapsed (Yes in S122), the CPU 72 sets the operation device 50 to the power saving state in S124. The process then returns to S110.

In this manner, in the process illustrated in FIG. 8, after the scan-to-USB memory process is executed in S150, when the CPU 72 determines that a document PA is no longer supported on the support part 40 (no in S110), first, the USB host controller 65 is set to the power saving state in S120, and thereafter, the operation device 50 is set to the power saving state in S124. It is noted that when a document PA becomes no longer supported on the support part 40, the USB host controller 65 becomes unlikely to be used. Accordingly, the USB host controller 65 is rapidly transitioned to the power saving state. Unnecessary power consumption by the USB host controller 65 can therefore be effectively suppressed.

Figure 9:
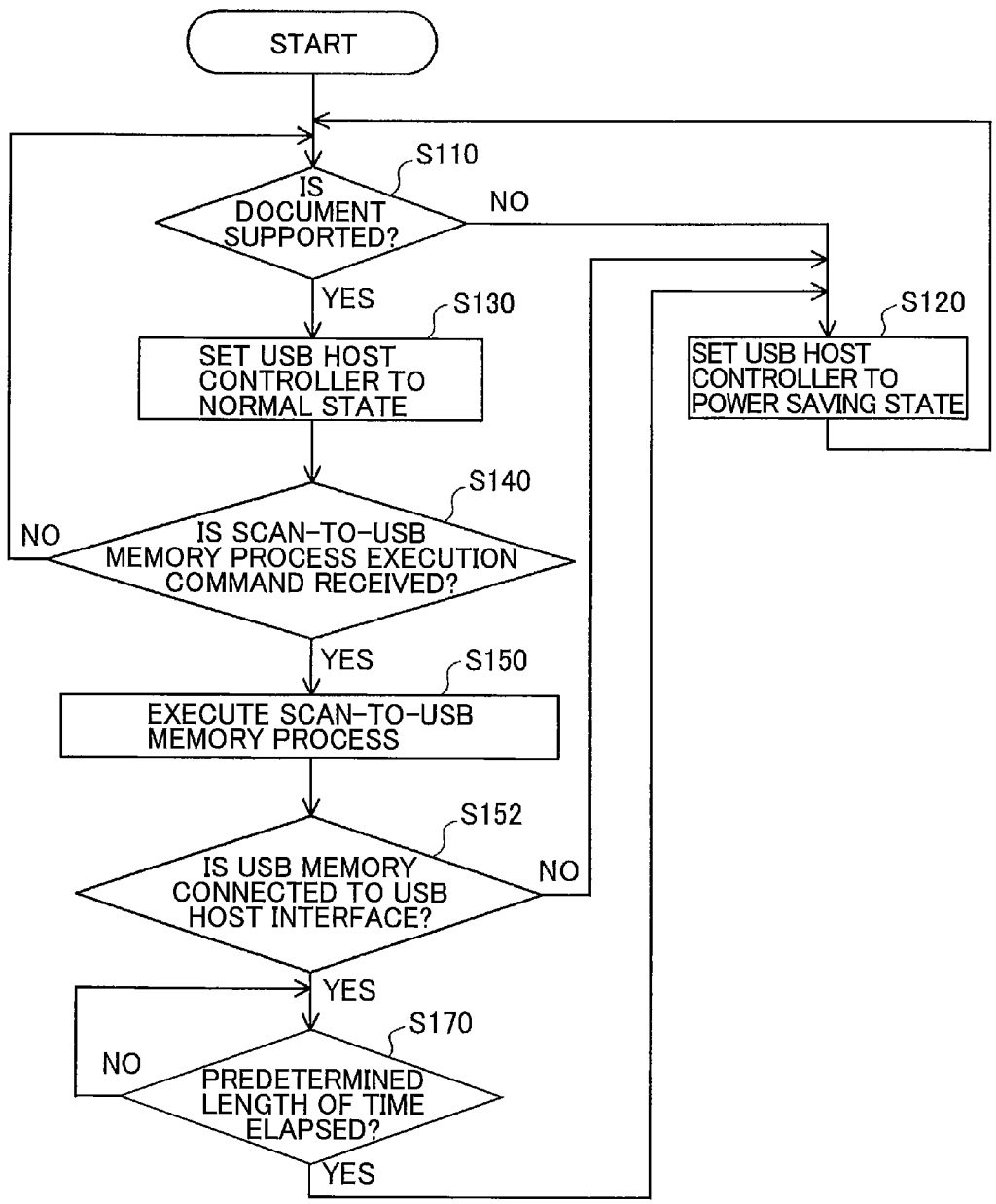
FIG. 9 is a flowchart illustrating the process of switching the state of the USB host controller according to another example (sixth example)

Next will be described, with reference to FIG. 9, the process of switching the state of the USB host controller 65 according to still another example (sixth example). The process in the sixth example illustrated in FIG. 9 is different from that of the first example illustrated in FIG. 4 in that processes in S152 and S170 are executed. More specifically, in the process illustrated in FIG. 9, after the scan-to-USB memory process is executed in S150, the CPU 72 determines in S152 whether or not the USB host interface 66 is still connected with a USB memory 5. When the CPU 72 determines that the USB host interface 66 is still connected with a USB memory 5 (Yes in S152), the CPU 72 waits for elapse of a predetermined length of time (Yes in S170), before setting the USB host controller 65 to the power saving state in S120. The process proceeds from S120 to S110.

On the other hand, when the CPU 72 determines that the USB host interface 66 is no longer connected with a USB memory 5 (No in S152), the CPU 72 sets in S120 the USB host controller 65 to the power saving state, without waiting for an elapse of the predetermined length of time. The procedure then returns to S110.

In this manner, in the process illustrated in FIG. 9, after the scan-to-USB memory process is executed in S150, when the CPU 72 determines that the USB host interface 66 is no longer connected with a USB memory 5, that is, when the CPU 72 determines that a USB memory 5 has been pulled out of the USB host interface 66, the USB host controller 65 is switched to the power saving state, without waiting for elapse of the predetermined length of time. Therefore, when the USB host controller 65 becomes unlikely to be used resulting from removal of the USB memory 5 from the USB host interface 66, the state of the USB host controller 65 is rapidly transitioned to the power saving state. Unnecessary power consumption by the USB host controller 65 can therefore be effectively suppressed.

Figure 10:
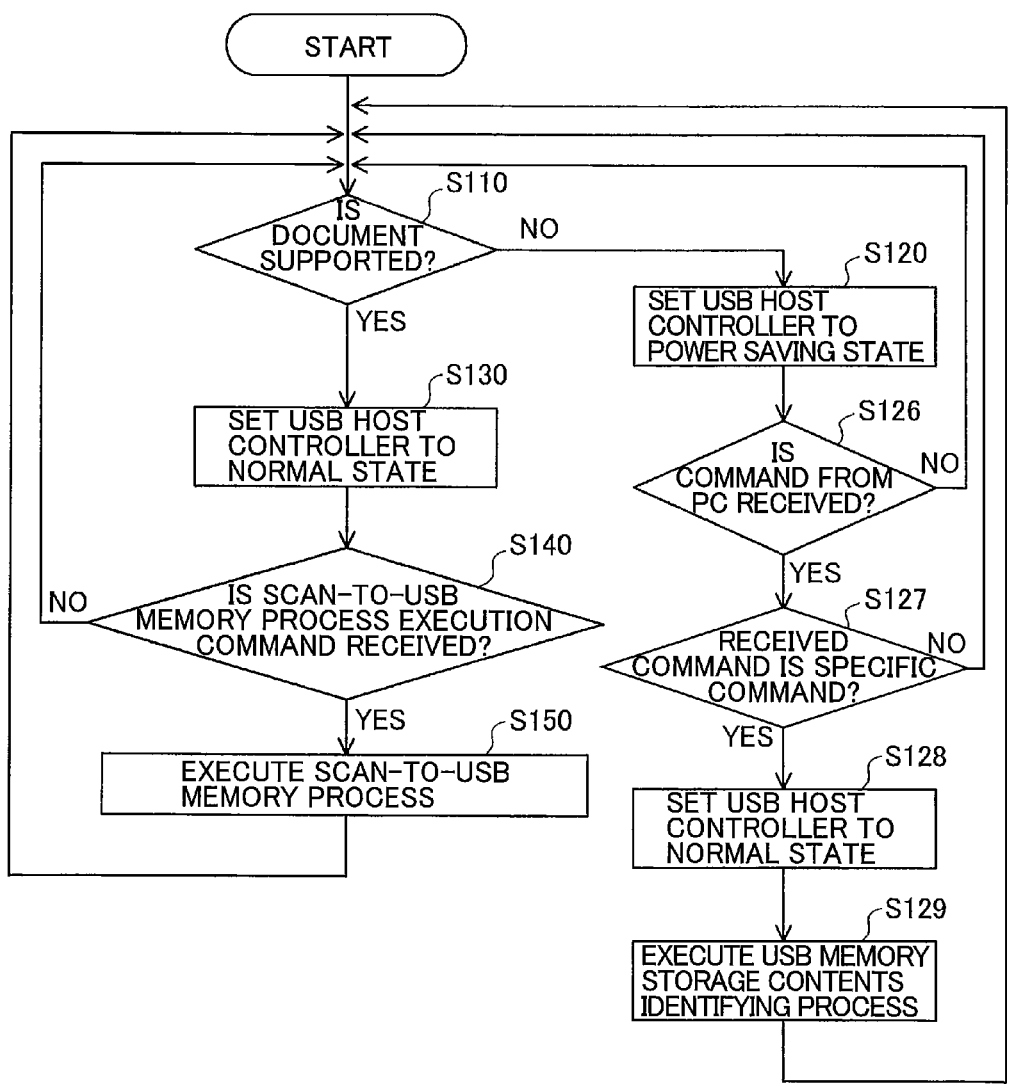
FIG. 10 is a flowchart illustrating the process of switching the state of the USB host controller according to still another example (seventh example)

Next will be described, with reference to FIG. 10, the process of switching the state of the USB host controller 65 according to still another example (seventh example). The process in the seventh example illustrated in FIG. 10 is different from that of the first example illustrated in FIG. 4 in that processes in S126, S127, S128, and S129 are executed. More specifically, in the process illustrated in FIG. 10, after the USB host controller 65 is set to the power saving state in S120, the CPU 72 determines in S126 whether or not a command from the PC 3 has been received. When no command has been received from the PC 3 (No in S126), the procedure returns to S110.

On the other hand, when a command has been received from the PC 3 (Yes in S126), the CPU 72 determines in S127 whether or not the received command is a prescribed specific command. In this example, the specific command is a command for identifying storage contents of a USB memory 5 that is connected to the USB host interface 66. More specifically, the specific command is a command requesting the scanner 2 to send information on the storage contents of the USC memory 5 to the PC 3. Upon receipt of the information, the PC 3 displays the information thereon, allowing a user to visually identify the storage contents of the USB memory 5. When the CPU 72 determines that the received command is not the specific command (No in S127), the procedure returns to S110.

On the other hand, when the CPU 72 determines that the received command is the specific command (Yes in S127), the CPU 72 sets in S128 the USB host controller 65 to the normal state. Next, the CPU 72 executes in S129 the processes for identifying the storage contents of a USB memory 5 connected to the USB host interface 66. That is, the CPU 72 checks the storage contents of the USB memory 5 via the USB host controller 65, and transmits information on the storage contents of the USB memory 5 to the PC 3 so that the PC 3 can display the information thereon. Then, the process returns to S110.

In this manner, in the process illustrated in FIG. 10, the USB host controller 65 is maintained in the power saving state, even though a command other the specific command is received from the PC 3 while the USB host controller 65 is being in the power saving state. Accordingly, unnecessary power consumption by the USB host controller 65 can be effectively suppressed. On the other hand, the USB host controller 65 is switched from the power saving state to the normal state when the specific command is received from the PC 3 while the USB host controller 65 is being in the power saving state. Accordingly, the USB host controller 65 can be switched to the normal state when it is necessary, that is, when the specific command is received from the PC 3. So, the scanner 2 can suppress power consumption, while suppressing deterioration in the convenience of the user.

The above-described configuration of the scanners 2 is merely an example, and various modifications are available. For example, in the above-described embodiment, one CPU 72 functions as a control device. However, a plurality of CPUs may function as a control device. Or, the ASIC 79 or the main controller 70 may function as a control device. The main controller 70 is a collective name of all the hardware units that include the CPU 72 and that are used for controlling the scanner 2. So, the main controller 70 may or may not be a single hardware unit provided in the scanner 2.

The components provided in the upper housing 22 may be provided in the lower housing 24, and on the contrary, the components provided in the lower housing 24 may be provided in the upper housing 22. The entire housing of the scanner 2 may be configured from a single housing or three or more housings. In the above-described embodiment, the operation device 50 includes the button 52 and the touch panel 54. However, the operation device 50 may include either one of the button 52 and the touch panel 54. Or, the operation device 50 may include an operation device other than the button and the touch panel. The touch panel 54 is not limited to the liquid crystal display, but may be configured from a display device of another type. In the above-described embodiment, a so-called photo sensor including the light-emitting element and the light-receiving element is used as the document sensor 56. However, other various types of sensor may be used as the document sensor 56.

The scanner 2 may not be provided with one or more interface among: the USB device interface 62; the network interface 64; and the USB host interface 66. In addition, the scanner 2 may be provided with interfaces of types other than the above-described interfaces (for example, a SD card interface and a wireless network interface).

In the above-described embodiment, supplying of power to the USB host controller 65 is stopped when the USB host controller 65 is in the power saving state. However, supplying of power is not necessarily stopped when the USB host controller 65 is in the power saving state. When the USB host controller 65 is in the power saving state, power may be supplied to the USB host controller 65 such that the amount of power supplied to the USB host controller 65 in the power saving state is smaller than that in the normal state. In this modification, however, the amount of power consumed by the USB host controller 65 satisfies such a condition that the difference between the amounts of power consumed in the normal state and in the power saving state is larger than that of power consumed by the document sensor 56.

The amount of power consumed by the USB host controller 65 in the normal state is not necessarily constant. Similarly, the amount of power consumed by the USB host controller 65 in the power saving state is not necessarily constant. In this modification, however, the amount of power consumed by the USB host controller 65 satisfies such a condition that the amount of power consumed in the power saving state is smaller than that in the normal state.

In the above-described embodiment, the light source in the touch panel 54 is being off when the touch panel 54 is in the power saving state. However, the light source is not necessarily being off. For example, the amount of light may be reduced when the touch panel 54 is in the power saving state in comparison with when the touch panel 54 is in the normal state. In place of, or in addition to the state of the touch panel 54, the state of the button 52 may be switched between the normal state and the power saving state. For example, the button 52 may include an LED lamp. The LED lamp may be on when the button 52 is in the normal state, and may be off when the button 52 is in the power saving state.

The above-described processes of switching the state of the USB host controller 65 are merely examples, and various modifications are available. For example, in the above-described processes, the USB host controller 65 has been set to the power saving state when the process is started. However, the USB host controller 65 may have been set to the normal state when the process is started.

The above-described processes of switching the state of the USB host controller 65 may be modified such that the USB host controller 65 is switched from the normal state to the power saving state when the following three conditions (i), (ii), and (iii) are met:
  (i) the USB host controller 65 is in the normal state;
  (ii) an interface of a type other than the USB host interface 66 (USB device interface 62 or network interface 64, in this example) is connected with an external device of a type other than the USB memory 5 (PC 3 or server 4, in this example); and
  (iii) it is detected that no document PA is supported on the support part 40 on the basis of a signal outputted from the document sensor 56.

Figure 11:
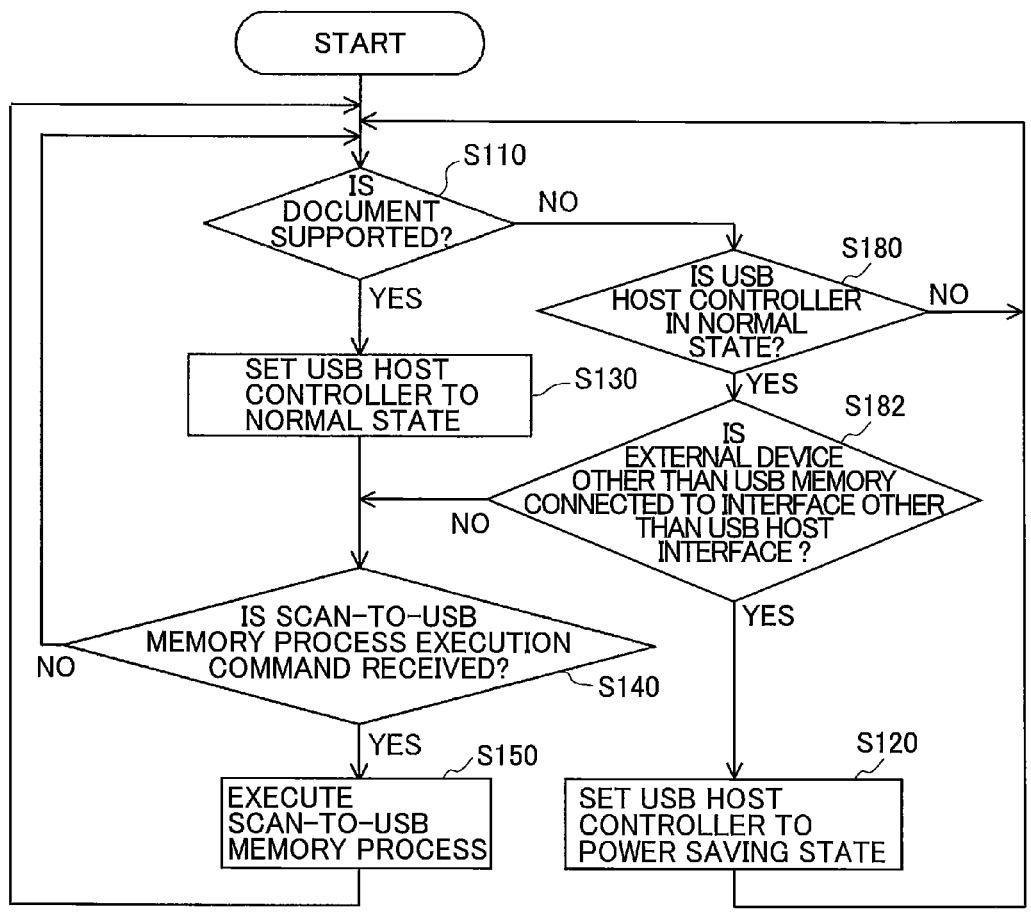
FIG. 11 is a flowchart illustrating the process of switching the state of the USB host controller according to a modification.

For example, the process in the first example illustrated in FIG. 4 may be modified as illustrated in FIG. 11. The process illustrated in FIG. 11 is different from that illustrated in FIG. 4 in that processes of S180 and S182 are executed. More specifically, in the process illustrated in FIG. 11, when the CPU 72 determines that no document PA is supported on the support part 40 (No in S110), the CPU 72 further determines in S180 whether the USB host controller 65 is in the normal state. When the USB host controller 65 is in the power saving state (No in S180), the procedure returns to S110. On the other hand, when the USB host controller 65 is in the normal state (Yes in S180), the CPU 72 further determines in S182 whether an interface, other than the USB host interface 66 (USB device interface 62 or network interface 64), is connected with an external device other than the USB memory 5 (PC 3 or server 4). When the USB device interface 62 is connected with a PC 3 or the network interface 64 is connected with the server 4 (Yes in S182), the procedure proceeds to S120. On the other hand, when the USB device interface 62 is not connected with a PC 3 and the network interface 64 is not connected with the server 4 (No in S182), the procedure proceeds to S140. According to this modification, while the scanner 2 is being connected to the network or external devices other than the USB memory 5, standby power consumption can be reduced.

In the above-described processes illustrated in FIGS. 4-11, when the CPU 72 determines in S110 that no document PA is supported on the support part 40, the USB host controller 65 is maintained in the power saving state, even though the operation device 50 is operated or manipulated by a user. However, the above-described processes illustrated in FIGS. 4-11 may be modified such that when a user operates or manipulates the operation device 50 multiple times, the storage contents of a USB memory 5 that is connected to the USB host interface 66 are displayed on the touch panel 54 so that the user can visually identify the storage contents of the USB memory 5. Namely, when a user operates the operation device 50 plural times, even though the CPU 72 determines that no document PA is supported on the support part 40, the CPU 72 may switch the USB host controller 65 to the normal state and display the storage contents of the USB memory 5 on the touch panel 54. Even in this modification, if the operation device 50 is operated or manipulated by a user only once, that is, if the operation device 50 receives only a first operation (first manipulation) by the user, the USB host controller 65 is maintained in the power saving state.

Figure 12:
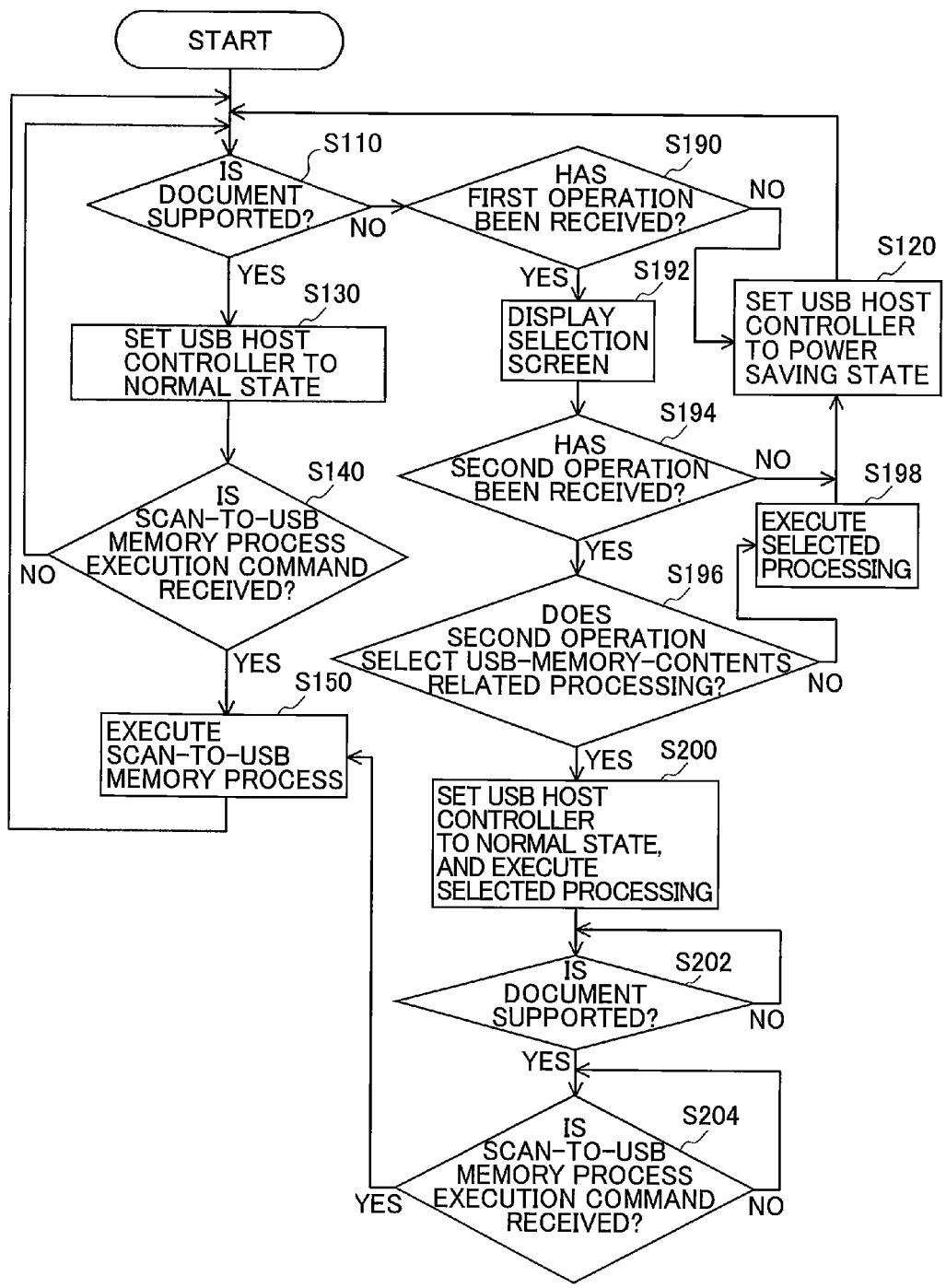
FIG. 12 is a flowchart illustrating the process of switching the state of the USB host controller according to another modification.

For example, the process in the first example illustrated in FIG. 4 may be modified as illustrated in FIG. 12. The process illustrated in FIG. 12 is different from that illustrated in FIG. 4 in that processes of S190, S192, S194, S196, S198, S200, S202, and S204 are executed. It is noted that the USB host controller 65 has been set in the power saving state when the process of FIG. 12 is started.

In the process illustrated in FIG. 12, when the CPU 72 determines that no document PA is supported on the support part 40 (No in S110), the CPU 72 further determines in S190 whether the operation device 50 has been operated or manipulated by a user for the first time after the process of FIG. 12 was started. In other words, the CPU 72 determines in S190 whether the operation device 50 has received the user's first operation (first manipulation). That is, the CPU 72 determines in S190 whether the operation device 50 has received first input. When the operation device 50 has not yet received the user's first operation (No in S190), the procedure proceeds to S120. On the other hand, when the operation device 50 has received the user's first operation (Yes in S190), the procedure proceeds to S192, in which the CPU 72 controls the operation device 50 to display a selection screen. The selection screen lists up information on a plurality of processings that are available by the scanner 2. The available processings contain several processings that are to be subjected on one or more files that are stored in a USB memory 5 connected to the USB host interface 66. Those processings will be referred to as "USB-memory-contents related processings" hereinafter. Examples of the USB-memory-contents related processings include: a processing of displaying, on the operation panel 54, the contents of the files in the USB memory 5; and a processing of deleting the files from the USB memory 5. The USB host controller 65 needs to be in the normal state, in order that the CPU 72 executes the USB-memory-contents related processings.

The procedure then proceeds from S192 to S194, in which the CPU 72 further determines whether the operation device 50 has been operated or manipulated by the user next, that is, for the second time. In other words, the CPU 72 determines in S194 whether the operation device 50 has received the user's second operation (second manipulation). That is, the CPU 72 determines in S194 whether the operation device 50 has received second input. When the operation device 50 has not yet received the user's second operation (No in S194), the procedure proceeds to S120. On the other hand, when the operation device 50 has received the user's second operation (Yes in S194), the CPU 72 further determines in S196 whether the user's second operation indicates his/her selection of one of the USB-memory-contents related processings. When the user's second operation does not select a USB-memory-contents related processing (No in S196), the CPU 72 executes in S198 a processing indicated by the user's second operation, that is, the user's selected processing. The procedure then proceeds to S120. On the other hand, when the user's second operation selects a USB-memory-contents related processing (Yes in S196), the procedure proceeds to S200, in which the CPU 72 sets the USB host controller 65 to the normal state, and executes the processing selected by the user's second operation. The procedure then proceeds from S200 to S202, in which the CPU 72 waits for a document being supported on the support part 40 (No in S202). When it is detected on the basis of a signal from the document sensor 56 that a document is supported on the support part 40 (Yes in S202), the CPU 72 further waits for receipt of a command to execute the scan-to-USB memory process in S204 (No in S204). When a scan-to-USB memory process execution command is received (Yes in S204), the procedure proceeds to S150.

According to this modification, when the operation device 50 has not yet received first input (No in S190), the USB host controller 65 is maintained in the power saving state in S120. When the operation device 50 receives first input (Yes in S190 and No in S194), display of the operation device 50 is transitioned to the selection screen in S192, but the USB host controller 65 is still maintained in the power saving state in S120. In this manner, the USB host controller 65 is maintained in the power saving state, regardless of whether the operation device 50 receives first input. When the operation device 50 receives second input indicative of the user's desire to perform a processing on the files stored in the USB memory 5 (Yes in S194 and Yes in S196), in S200 the CPU 72 switches the USB host controller 65 from the power saving state to the normal state, and performs the user's selected processing. In the above-described manner, according to this modification, when the USB host controller 65 needs to be switched to the normal state resulting from the multiple inputs to the operation device 50, the CPU 72 switches the USB host controller 65 from the power saving state to the normal state.

It is noted that the judgment process in S190 may be made positive also when the operation device 50 is operated by a user for the first time after the scan-to-USB memory process of S150 was completed.

Similarly, the judgment process in S190 may be made positive also when the operation device 50 is operated by a user for the first time while the operation device 50 is being in the operation-device power saving state. In this case, the procedure proceeds from S190 to S192, in which the operation device 50 is switched from the operation-device power saving state to the operation-device normal state, before displaying the selection screen.

In the above-described scanner 2, the position of the image sensor 32 is fixed in the lower housing 24 and a document PA is conveyed relative to the image sensor 32. However, the scanner 2 may be modified to a so-called flatbed type scanner, in which the position of a document PA is fixed relative to the housing of the scanner and the image sensor is moved relative to the document PA. The flatbed scanner has a document stand and a cover capable of covering the document stand. In the flatbed type scanner, the document stand is an example of the support part supporting the document, and a cover open sensor detecting the opened state of the cover is an example of the sensor device. The transition condition includes a condition that the opened state of the cover is detected on the basis of a signal outputted from the cover open sensor. In the flatbed type scanner, when a user desires to place a document on the document stand, the user opens the cover into the opened state. Therefore, by setting the USB host controller 65 to the normal state when the opened state of the cover is detected, it is ensured that image data generated by reading the document PA is stored in a USB memory 5 connected to the USB host interface 66. In addition, while the opened state of the cover is not being detected, even though the operation device 50 is operated by a user, if the operation device 50 is operated only once, the USB host controller 65 is maintained in the power saving state. Possibility that power is unnecessarily consumed by the USB host controller 65 can be reduced, and the amount of power consumed by the scanner 2 can be suppressed.

The flatbed type scanner may be provided with an automatic document feeding unit. The automatic document feeding unit is provided with a document sensor. In this case, the transition condition includes: a condition that mounting of a document on the automatic document feeding unit is detected on the basis of a signal issued from the document sensor; or a condition that the opened state of the cover is detected on the basis of a signal issued from the cover open sensor.

In the above-described embodiment, the scanner 2 is of an equi-magnification optical system type that is provided with the contact type image sensor 32. However, the scanner 2 may be modified to a reduction optical system type. In the above-described embodiment, the scanner 2 has only the scanner function. However, the scanner 2 may be modified to a multi-functional machine having multiple functions including the scanner function.

In the above-described embodiment, the PHY unit 67 in the USB host controller 65 has the PLL circuit 68. However, the USB host controller 65 may not have the PLL circuit 68.

In the above-described embodiment, the scanner 2 switches the state of the USB host controller 65 that controls the USB host interface 66. However, the scanner 2 may be modified to switch the state of an interface controller of another type that controls an interface of another type. For example, the scanner 2 may be modified to switch the state of an SD card controller that controls an SD card interface.

While the description has been made in detail with reference to the specific embodiment and modifications thereof, it would be apparent to those skilled in the art that various changes and modifications may be made therein without departing from the spirit and scope of the above described embodiment and modifications.

For example, the embodiment and modifications described above can be modified in various forms other than: the reading apparatus; the method of controlling the reading apparatus; a computer program for realizing functions of the reading apparatus or the method of controlling the reading apparatus; and the non-transitory recording medium (storage medium) storing the computer program.

What is claimed is:

1. A reading apparatus, comprising:
   a reading device configured to read a document and generate image data;
   a support part configured to support the document to be read by the reading device;
   a sensor device configured to detect whether a document is supported by the support part and output a signal indicative of a detection result;
   a receiving device configured to receive input;
   a first interface configured to be connected with a first external device, the first external device being configured to store the image data generated by the reading device, the first interface being a USB host interface, and the first external device being a USB memory;
   a first-interface control device configured to control the first interface, the first-interface control device being a USB host controller, the first-interface control device being configured to be set into either one of a plurality of different states, the plurality of states including a normal state and a power saving state, the first-interface control device in the normal state being capable of detecting whether the first external device is connected with the first interface, the first-interface control device in the power saving state being incapable of detecting whether the first external device is connected with the first interface, an amount of power consumed by the first-interface control device in the power saving state being smaller than that consumed by the first-interface control device in the normal state; and
   a control device configured to
      determine whether a document is supported by the support part based on the signal outputted from the sensor device, and
      set the first-interface control device into the normal state or the power saving state dependent upon a determination result of whether a document is supported by the support part,
      wherein the setting includes maintaining the first-interface control device in the power saving state when it is determined that no document is supported by the support while the first-interface control device is in the power saving state, regardless of whether the receiving device receives first input.

2. The reading apparatus according to claim 1, further comprising:
   a second interface configured to be connected with a second external device, the second external device being configured to store the image data generated by the reading device; and
   a second-interface control device configured to control the second interface, wherein the second external device is of a type different from that of the first external device, wherein the second interface is a different type from that of the first interface, wherein the control device is configured to further determine whether the second external device is connected with the second interface, and wherein the setting further includes setting the first-interlace control device into the normal state when it is determined that a document is supported by the support part and the second external device is not connected with the second interface while the first-interface control device is in the power saving state.

3. The reading apparatus according to claim 1, further comprising:

a second interface configured to be connected with a second external device, the second external device being configured to store the image data generated by the reading device; and a second-interface control device configured to control the second interface, wherein the second external device is of a type different from that of the first external device, wherein the second interface is of a type different from that of the first interface, wherein the control device is further configured to set, as an image data storage site for the image data generated by the reading device, either one of the first external device that is connected with the first interface, and the second external device that is in a state in which the second external device is capable of communicating with the control device via the second interface, wherein the control device is configured to further determine whether the first external device connected with the first interface is set as the image data storage site, and wherein the setting further includes setting the first-interface control device into the normal state when it is determined that a document is supported by the support part and the first external device connected with the first interface is set as the image data storage site while the first-interface control device is in the power saving state.

4. The reading apparatus according to claim 1, wherein the setting further includes:

setting the first-interface control device into the normal state when it is determined that a document is supported by the support part while the first-interface control device is in the power saving state.

5. The reading apparatus according to claim 1, wherein the receiving device is configured to be set into either one of a plurality of different states, the plurality of different states including a receiving-device normal state and a receiving-device power saving state, an amount of power consumed by the receiving device in the receiving-device power saving state being smaller than that consumed by the receiving device in the receiving-device normal state, and wherein the control device is further configured such that after the control device has controlled the reading device to generate image data and while the first-interface control device is in the normal state and the receiving device is in the receiving-device normal state, when it is determined that no document is supported by the support part based on the signal outputted from the sensor device, the control device sets the first-interface control device to the power saving state and thereafter sets the receiving device to the receiving-device power saving state.

6. The reading apparatus according to claim 1, wherein the control device is further configured to set the first-interface control device to the power saving state when the control device detects through the first-interface control device that the first interface is not connected with the first external device after the control device has controlled the reading device to generate image data and while the first-interface control device is in the normal state.

7. The reading apparatus according to claim 1, further comprising another interface configured to be connected with another external device which is configured to output a command to the control device, the another interface being other than the first interface, the another external device being other than the first external device, wherein the control device is further configured such that after the control device receives a command other than a specific command from the another external device through the another interface and while the first-interface control device is in the power saving state, when it is determined that no document is supported by the support part based on the signal outputted from the sensor device, the control device maintains the first-interface control device to the power saving state.

8. The reading apparatus according to claim 7, wherein the control device is further configured to set the first-interface control device to the normal state when the control device receives the specific command from the another external device through the another interface while the first-interface control device is in the power saving state.

9. The reading apparatus according to claim 1, wherein the USB host controller includes a PLL circuit.

10. The reading apparatus according to claim 1, further comprising:

a second interface configured to be connected with a second external device, the second external device being configured to store the image data generated by the reading device; and a second-interface control device configured to control the second interface, wherein the control device is further configured to determine whether the first-internal control device is in the normal state, and determine whether the second external device is connected with the second interface, and wherein the setting includes switching the first-interface control device from the normal state to the power saving state when it is determined that no document is supported by the support part based on the signal outputted from the sensor device, the first-interface control device is in the normal state, and the second external device is connected with the second interface.

11. A method for controlling a reading apparatus, the reading apparatus comprising:

a reading device configured to read a document and generate image data;

a support part configured to support the document to be read by the reading device;

a sensor device configured to detect whether a document is supported by the support part and output a signal indicative of a detection result;

a receiving device configured to receive input;

a first interface configured to be connected with a first external device, the first external device being configured to store the image data generated by the reading device, the first interface being a USB host interface, and the first external device being a USB memory;

a first-interface control device configured to control the first interface, the first-interface control device being a USB host controller, the first-interface control device being configured to be set into either one of a plurality of different states, the plurality of states including a normal state and a power saving state, the first-interface control device in the normal state being capable of detecting whether the first external device is connected with the first interface, the first-interface control device in the power saving state being incapable of detecting whether the first external device is connected with the first interface, an amount of power consumed by the first-interface control device in the power saving state being smaller than that consumed by the first-interface control device in the normal state;

wherein the method comprises:

determining whether a document is supported by the support part based on the signal outputted from the sensor device; and setting the first-interface control device into the normal state or the power saving state dependent upon a determination result of whether a document is supported by the support part, wherein the setting includes maintaining the first-interface control device in the power saving state when it is determined that no document is supported by the support part while the first-interface control device is in the power saving state, regardless of whether the receiving device receives first input.

12. A non-transitory computer readable storage medium storing a set of program instructions installed on and executed by a computer for controlling a reading apparatus, the reading apparatus comprising:

a reading device configured to read a document and generate image data;

a support part configured to support the document to be read by the reading device;

a sensor device configured to detect whether a document is supported by the support part and output a signal indicative of a detection result;

a receiving device configured to receive input;

a first interface configured to be connected with a first external device, the first external device being configured to store the image data generated by the reading device, the first interface being a USB host interface, and the first external device being a USB memory;

a first-interface control device configured to control the first interface, the first-interface control device being a USB host controller, the first-interface control device being configured to be set into either one of a plurality of different states, the plurality of states including a normal state and a power saving state, the first-interface control device in the normal state being capable of detecting whether the first external device is connected with the first interface, the first-interface control device in the power saving state being incapable of detecting whether the first external device is connected with the first interface, an amount of power consumed by the first-interface control device in the power saving state being smaller than that consumed by the first-interface control device in the normal state;

wherein the program instructions comprise:

determining whether a document is supported by the support part based on the signal outputted from the sensor device; and setting the first-interface control device into the normal state or the power saving state dependent upon a determination result of whether a document is supported by the support part, wherein the setting includes maintaining the first-interface control device in the power saving state when it is determined that no document is supported by the support part while the first-interface control device is in the power saving state, regardless of whether the receiving device receives first input.

13. The reading apparatus according to claim 4, wherein the control device is further configured to control the reading device to read the document, to generate image data, and to store the image data into the first external device, regardless of whether the receiving device receives the input, when the control device detects through the first-interface control device that the first external device is connected to the first interface after the control device has set the first-interface control device to the normal state.

14. The method according to claim 11, wherein the setting further includes:

setting the first-interface control device into the normal state when it is determined that a document is supported by the support part while the first-interface control device is in the power saving state.

15. The non-transitory computer readable storage medium according to claim 12, wherein the setting further includes:

setting the first-interface control device into the normal state when it is determined that a document is supported by the support part while the first-interface control device is in the power saving state.

* * * * *